United States Patent
Xie

(10) Patent No.: US 9,020,512 B2
(45) Date of Patent: Apr. 28, 2015

(54) METHOD AND SYSTEM FOR TRANSMITTING RADIO SIGNAL, AND A BASE STATION USING THE SAME

(75) Inventor: Pei-Ren Xie, JiangSu (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 242 days.

(21) Appl. No.: 13/555,630

(22) Filed: Jul. 23, 2012

(65) Prior Publication Data

US 2013/0084875 A1    Apr. 4, 2013

(30) Foreign Application Priority Data

Sep. 30, 2011  (CN) .......................... 2011 1 0293869

(51) Int. Cl.
*H04Q 7/20* (2006.01)
*H04W 28/08* (2009.01)
*H04W 36/22* (2009.01)

(52) U.S. Cl.
CPC .............. *H04W 28/08* (2013.01); *H04W 36/22* (2013.01)

(58) Field of Classification Search
CPC ...... H04W 36/14; H04W 24/02; H04W 28/16
USPC ......................................... 455/415, 416, 418
See application file for complete search history.

(56) References Cited

U.S. PATENT DOCUMENTS 7,606,202 B2 *   10/2009   Marathe et al. ............... 370/331

FOREIGN PATENT DOCUMENTS

CN          101554079 A      10/2009

OTHER PUBLICATIONS

CN Office Action dated Dec. 1, 2014.
English Abstract translation of CN101554079 (published Oct. 7, 2009).

* cited by examiner

*Primary Examiner* — Kwasi Karikari
*Assistant Examiner* — Randy Peaches
(74) *Attorney, Agent, or Firm* — McClure, Qualey & Rodack, LLP

(57) ABSTRACT

A radio signal transmission method is used in a radio signal transmission system having a core network (CN), at least one base station and at least one user equipment (UE). After the UE initiates a circuit switch (CS) call, the base station determines whether to activate CS off-loading. If to activate CS off-loading, the base station determines whether identification (ID) codes of all call parties reside on the same base station or on the same group of base stations of the system. If yes, the base station determines whether to off-load only the user-plane data. If yes, the CN controls the signaling and the user-plane data is directly forwarded to another call party; otherwise, the base station processes a signaling and the user-plane data is directly forwarded to another call party via the base station.

16 Claims, 4 Drawing Sheets

METHOD AND SYSTEM FOR TRANSMITTING RADIO SIGNAL, AND A BASE STATION USING THE SAME

This application claims the benefit of People's Republic of China application Serial No. 201110293869.6, filed Sep. 30, 2011, the subject matter of which is incorporated herein by reference.

BACKGROUND

1. Technical Field

The disclosure relates in general to a method and a system for transmitting radio signal, and a base station using the same.

2. Description of the Related Art

Radio mobile communication system, such as third generation (3G) technology and long term evolution (LTE) standard, aims to provide users with access to broadband radio multi-media services whenever and wherever the access is desired. The LTE system allows service supplier to provide wireless broadband service more economically, and has better efficiency than the 3G wireless network.

The radio mobile communication system provides high-quality voice service and/or high speed access band, supports multiple service quality mechanism, satisfies instant/non-instant services having mixed voice/data, enhances security mechanism, and has multi-access service (capable of making calls and accessing the Internet at the same time) and video call functions.

As wireless signal transmission and wireless network application are getting more and more popular, more and more users make voice call or video call via wireless network (such as 3G and LTE). The application of voice/video call may be regarded as a part of the application of circuit switch (CS). Currently, signaling and user-plane data for voice/video call increase loading and occupy band for the Internet and the operator's CN (core network). The more calls come at the same time, the heavier the loading and band occupation will be.

Thus, the disclosure provides a method and a system for transmitting radio signal, and a base station using the same, which is for off-loading signaling and/or user-plane data, to save the Internet loading and bandwidth resource for operator's CN when users are making calls.

SUMMARY OF THE DISCLOSURE

The disclosure is directed to a method and a system for transmitting radio signal, and a base station using the same. The signaling is controlled by a core network (CN), but transmission of user-plane data is controlled by the base station so transmission of the user-plane data is not through the CN or the Internet. However, the CN is still able to control signaling and timing/billing.

An embodiment of the disclosure is directed to a method and a system for transmitting radio signal, and a base station using the same. The signaling is controlled by the base station, and the user-plane data is directly forwarded to another party of the call via the base station.

An embodiment of the disclosure is directed to a method and a system for transmitting radio signal, and a base station using the same, which determines whether to activate off-loading and how to implement off-loading.

According to an exemplary embodiment of the present disclosure, a radio signal transmission method used in a radio signal transmission system is provided. The radio signal transmission system includes a core network (CN), at least one base station and at least one user equipment (UE). After the UE initiates a circuit switch (CS) call, the base station determines whether to activate CS off-loading. If CS off-loading is to be activated, then the base station determines whether identification (ID) codes of all call parties reside on the same base station or on the same group of base stations of the system. If the ID codes of the call parties reside on the same base station or on the same group of base stations, then the base station determines whether to off-load only a user-plane data. If the base station determines to off-load not only the user-plane data, then the base station processes a signaling and the user-plane data is directly forwarded to another call party of the call via the base station. If the base station determines to off-load only the user-plane data, then the CN controls the signaling and the user-plane data is directly forwarded to another call party of the call via the base station.

According to an exemplary embodiment of the present disclosure, a radio signal transmission system is provided. The system includes a CN, at least one base station wirelessly coupled to the CN and at least one user equipment (UE) wirelessly coupled to the base station. After the UE initiates a circuit switch (CS) call, the base station determines whether to activate CS off-loading. If CS off-loading is to be activated, then the base station determines whether identification (ID) codes of all call parties reside on the same base station or on the same group of base stations of the radio signal transmission system. If the ID codes of the call parties reside on the same base station or on the same group of base stations, then the base station determines whether to off-load only a user-plane data. If the base station determines to off-load not only the user-plane data, then a signaling is processed by the base station, and the user-plane data is directly forwarded to another call party of the call via the base station. If the base station determines to off-load only the user-plane data, then the signaling is controlled by the CN, and the user-plane data is directly forwarded to another call party of the call via the base station.

According to an exemplary embodiment of the present disclosure, a radio signal transmission method used in at least one base station is provided. The base station wirelessly coupled to a core network (CN) and at least one user equipment (UE). When receiving a circuit switch (CS) call initiated by the UE, the base station determines whether to activate CS off-loading. If CS off-loading is to be activated, then the base station determines whether identification (ID) codes of all call parties reside on the same base station or on the same group of base stations of the radio signal transmission system. If yes, then the base station determines whether to off-load only a user-plane data. If the base station determines to off-load not only the user-plane data, then a signaling is processed by the base station, and the user-plane data is directly forwarded to another call party of the call via the base station. If the base station determines to off-load only the user-plane data, then the base station transmits the signaling to the CN for the CN to control the signaling, and the user-plane data is directly forwarded to another call party of the call via the base station.

According to an exemplary embodiment of the present disclosure, a base station is provided. The base station includes: a control unit, a radio interface coupled to the control unit and controlled by the control unit, and a network interface coupled to the control unit and controlled by the control unit. When the radio interface receives a circuit switch (CS) call initiated by a UE, the control unit determines whether to activate CS off-loading. If CS off-loading is to be activated, then the control unit determines whether identification (ID) codes of all call parties reside on the same base station or on the same group of base stations of the radio signal transmission system. If the ID codes of the call parties reside on the same base station or on the same group of base stations, then the control unit determines whether to off-load only a user-plane data. If the control unit determines to off-load not only the user-plane data, then a signaling is processed by the control unit, and the user-plane data is directly forwarded to another call party of the call via the radio interface. If the base station determines to off-load only the user-plane data, then the control unit transmits the signaling to a CN via the network interface for the CN to control the signaling, and the user-plane data is directly forwarded to another call party of the call via the radio interface.

The above and other contents of the disclosure will become better understood with regard to the following detailed description of the preferred but non-limiting embodiment(s). The following description is made with reference to the accompanying drawings.

Figure 1:
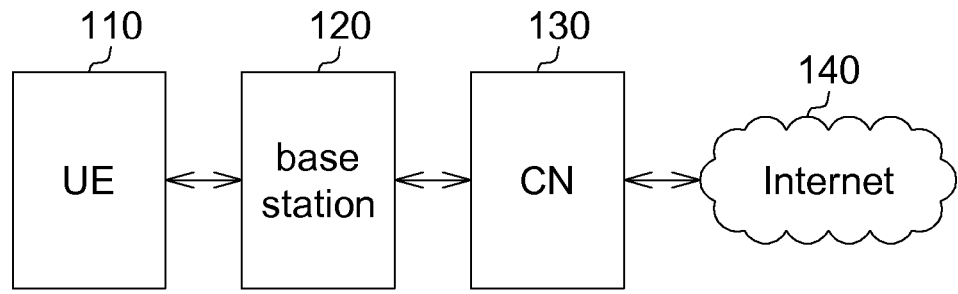
FIG. 1 shows a schematic diagram of a radio signal transmission system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

The principles of structure and operation of the disclosure are elaborated below with accompanying drawings.

The base station obtains a circuit switch (CS) off-loading configuration from a core network (CN). When a user-equipment (UE) initiates a circuit switch (CS) call, the base station determines whether to activate CS off-loading function for the CS call. If the CS off-loading function is to be activated, then the base station further determines which implementation of CS off-loading is used.

Referring to FIG. 1, a schematic diagram of a radio signal transmission system according to an embodiment of the disclosure is shown. The radio signal transmission system includes a user equipment (UE) 110, a base station 120 and a core network (CN) 130. The UE 110 and the base station 120 are wirelessly coupled. The CN 130 and the base station 120 are wirelessly coupled.

The UE 110 is a user's mobile terminal equipment such as but not limited to a 3G/3.5G/4G mobile phone. With the UE 110, the user may get on the Internet, and make a voice or a video call. Despite only one UE 110 is illustrated in FIG. 1, the number of UE is not limited by this.

The base station 120 provides the UE 110 with the service of getting access to the CN 130. The base station is for transmitting radio signals to and receiving radio signals from one or more than one UE 110.

The CN 130 is for exchanging the signaling. The CN 130 is interfaced to an external network such as public switched telephone network (PST, that is, ordinary landline and mobile phone), integrated services digital network (ISDN), and the Internet 140.

The base station 120, such as a home node-B (HNB) and a home evolved node-B (HeNB), provides 3G/3.5G/4G radio coverage for 3G/3.5G/4G mobile phones in households or offices.

Figure 2:
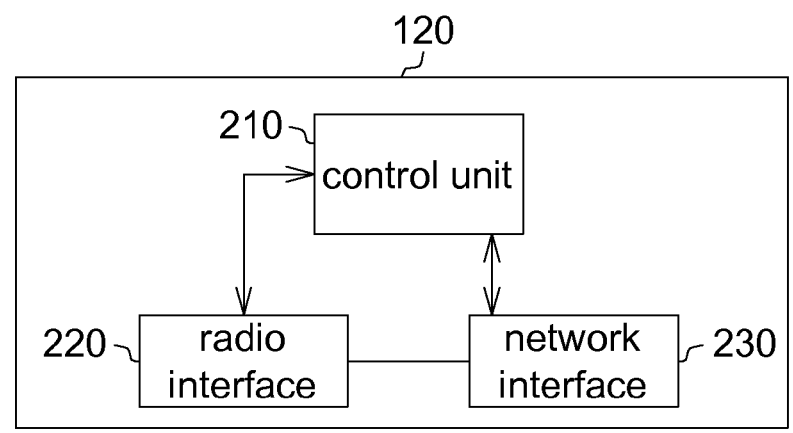
FIG. 2 shows a function block diagram of a base station according to the embodiment of the disclosure.

Referring to FIG. 2, a function block diagram of the base station 120 according to the embodiment of the disclosure is shown. As indicated in FIG. 2, the base station 120 comprises a control unit 210, a radio interface 220 and a network interface 230. The control unit 210 is coupled to the radio interface 220 and the network interface 230 to control transmission of signals and data into/from the base station 120.

The radio interface 220 is an interface between the base station 120 and the UE 110, and may be regarded as a "user interface". The radio interface 220 transmits data via radio signals and is referred as a "radio interface". The network interface 230 is an interface between the base station 120 and the CN 130.

Figure 3:
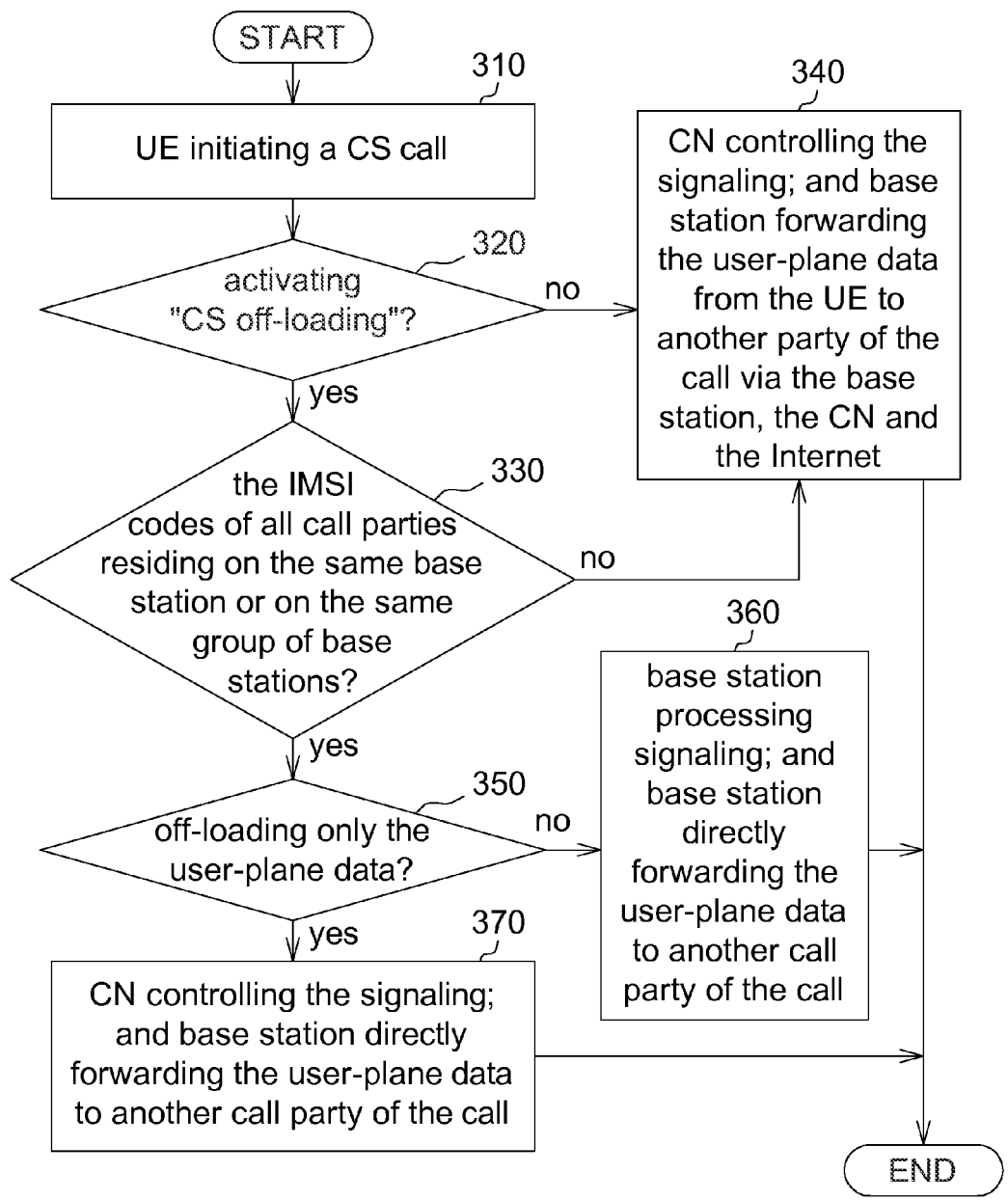
FIG. 3 shows a flowchart of a radio signal transmission method according to the embodiment of the disclosure.

Referring to FIG. 3, a flowchart of a radio signal transmission method according to the embodiment of the disclosure is shown. In step 310, the UE initiates a CS call. For example, when the UE would like to make a voice or a video call, the UE initiates a CS call to the base station.

In step 320, the base station determines whether to activate "CS off-loading". In the embodiment of the disclosure, after the base station is booted, the base station obtains a CS off-loading configuration from a home node-B management system (HMS) of the CN. The CS off-loading configuration records details related to CS off-loading. The HMS is an element of the operator's CN. When the UE initiates a CS call, the base station determines whether to perform CS off-loading according to the CS off-loading configuration.

If the determination result in step 320 is yes, then the process proceeds to step 330. If the determination result in step 320 is no, then the process proceeds to step 340.

In step 330, the base station determines whether international mobile subscriber identity (IMSI) codes of all call parties reside on the same base station or on the same group of base stations. In greater details, when receiving the CS call initiated by the UE, the base station obtains the callee's telephone number. The base station finds the corresponding IMSI code from the configuration. If (1) the callee's IMSI code can be found and (2) the caller's and the callee's IMSI codes reside on the same base station or on the same group of base stations, then CS off-loading may be performed on the current call. If the callee's IMSI code and the caller's IMSI code do not reside on the same base station or on the same group of base stations, then the base station transmits the signaling to the CN so that the signaling is controlled by the CN.

If the determination result in step 330 is yes, then the process proceeds to step 350. If the determination result in step 330 is no, then the process proceeds to step 340.

If (1) the base station determines not to activate "CS off-loading" (step 320) or (2) the base station determines all call parties' IMSI codes do not reside on the same base station or on the same group of base stations (step 330), then in step 340, the signaling is controlled by the CN, and the user-plane data from the UE of call parties is forwarded to another party of the call via the base station, the CN and the Internet.

If (1) the base station determines to activate "CS off-loading" (step 320) and (2) the base station determines all call parties' IMSI codes reside on the same base station or on the same group of base stations (step 330), then in step 350, the base station determines whether to off-load only the user-plane data.

If the base station determines to off-load not only user-plane data, then in step 360, the signaling is processed by the base station, and the user-plane data is directly forwarded to another party of the call via the base station. Both the signaling and the user-plane data are processed by the base station instead of the CN, and pass through neither the CN nor the Internet.

That is, in step 360, all signals of the CS call are processed by the base station. After a call is established, all user-plane data from the UE is directly forwarded to another party of the call via the base station.

If the base station determines to off-load only user-plane data, then in step 370, the signaling is controlled by the CN, and the user-plane data is directly forwarded to another party of the call via the base station. In step 370, since the signaling is still controlled by the CN, the CN obtains the duration and object of the call made by the UE, and the CN is still able to control signaling and timing/billing.

In step 370, all signals of the CS call are transmitted to the operator's CN as normal. If the callee's IMSI code resides on the same base station or on the same group of base stations, then all user-plane data from the UE in the base station is directly forwarded to another party of the call after a call is successfully established.

In the flowchart of FIG. 3, the determination operation in the base station (such as steps 320, 330 and 350) is performed by such as the control unit 210. The signaling and user-plane data between the base station and the UE are transmitted and received via the radio interface 220. The signaling and user-plane data between the base station and the CN are transmitted and received via the network interface 230.

Figure 4A:
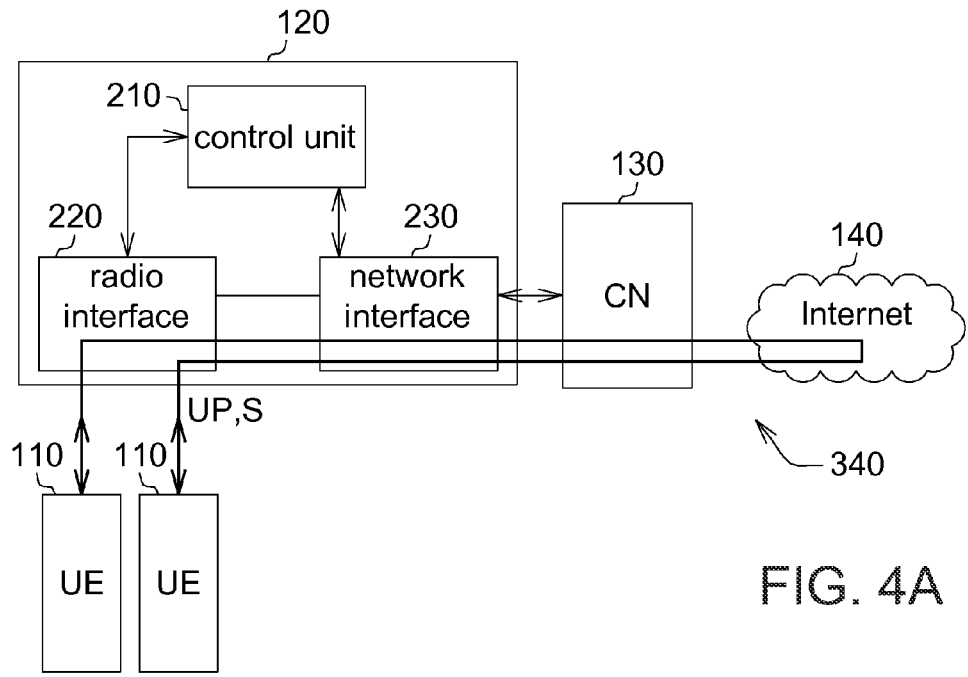
FIG. 4A shows step 340 according to the embodiment of the disclosure, wherein, the signaling is controlled by the CN, and the user-plane data is forwarded to another party of the call via the base station, the CN and the Internet.
Figure 4B:
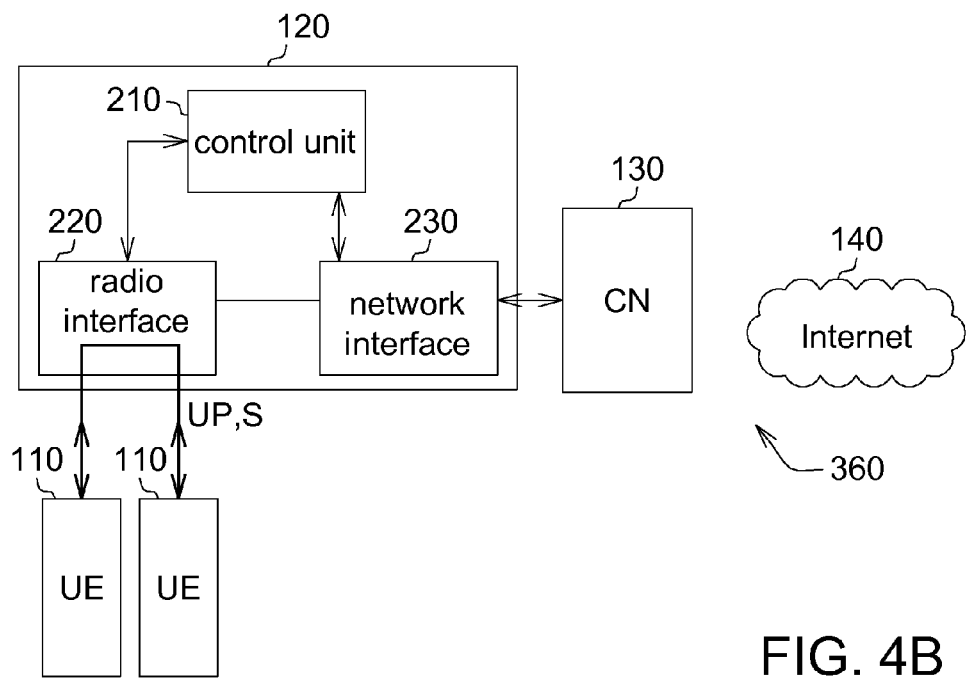
FIG. 4B shows step 360 according to the embodiment of the disclosure, wherein, the signaling is processed by the base station, and the user-plane data is directly forwarded to another party of the call via the base station.
Figure 4C:
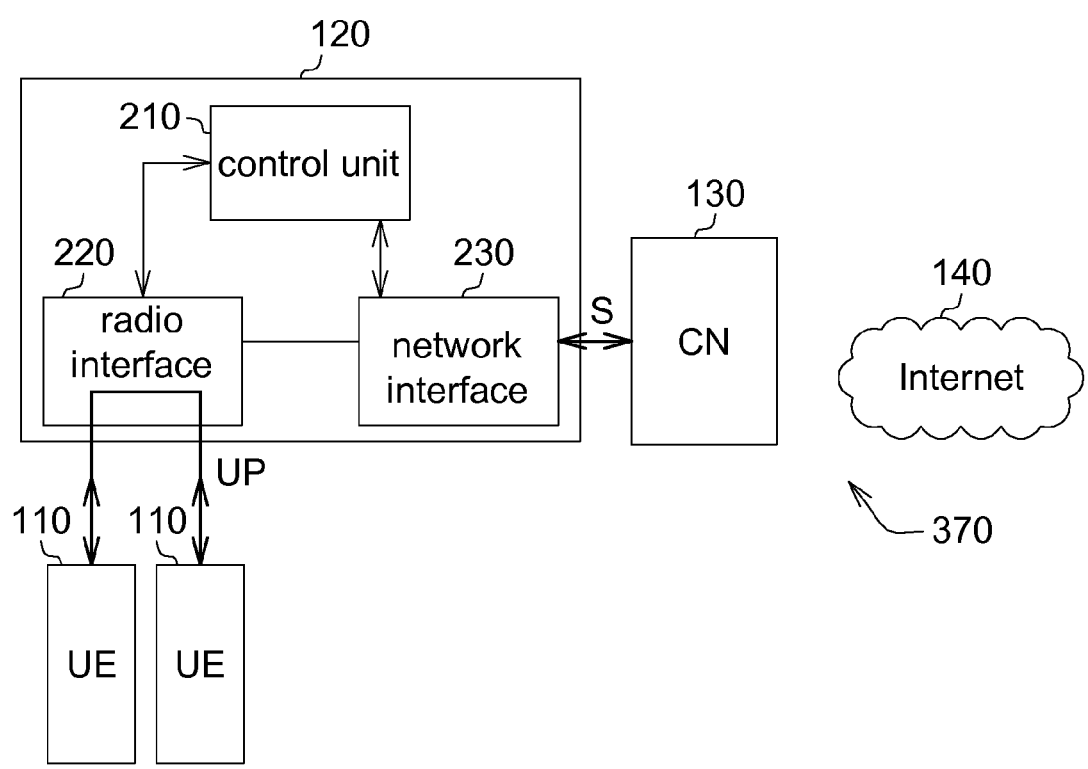
FIG. 4C shows step 370 according to the embodiment of the disclosure, wherein, the signaling is controlled by the CN, and the user-plane data is directly forwarded to another party of the call via the base station.

FIG. 4A shows the step 340 according to the embodiment of the disclosure, wherein, the signaling is controlled by the CN, and the user-plane data is forwarded to another party of the call via the base station, the CN and the Internet. In FIGS. 4A-4C, "S" denotes signaling and "UP" denotes user-plane data.

FIG. 4B shows the step 360 according to the embodiment of the disclosure, wherein, the signaling is processed by the base station, and the user-plane data is directly forwarded to another party of the call via the base station.

FIG. 4C shows the step 370 according to the embodiment of the disclosure, wherein, the signaling is controlled by the CN, and the user-plane data is directly forwarded to another party of the call via the base station.

As disclosed in the embodiments of the disclosure, in the first implementation of CS off-loading, signaling is controlled by the CN, but transmission of user-plane data is controlled by the base station, that is, transmission of user-plane data passes through neither the CN nor the Internet. Given that the CN is off-loaded and the band occupied by the Internet is narrowed, the CN is still able to control signaling and timing/billing. In the second implementation of CS off-loading, the signaling is controlled by the base station but the transmission of user-plane data is directly forwarded to another party of the call in the base station, so that the loading of the CN is reduced. In an embodiment of the disclosure, it is determined whether to activate CS off-loading and which implementation of CS off-loading to use so as to meet various needs.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A radio signal transmission method used in a radio signal transmission system comprising a core network (CN), at least one base station and at least one user equipment (UE), the radio signal transmission method comprising:
   determining by the base station whether to activate CS off-loading after the UE initiates a circuit switch (CS) call;
   determining by the base station whether identification (ID) codes of all call parties reside on the same base station or on the same group of base stations of the radio signal transmission system, if CS off-loading is to be activated;
   determining by the base station whether to off-load only a user-plane data if the ID codes of the call parties reside on the same base station or on the same group of base stations;
   processing a signaling by the base station and directly forwarding the user-plane data to another call party of the call via the base station if the base station determines to off-load not only the user-plane data; and
   controlling the signaling by the CN and directly forwarding the user-plane data to another call party of the call via the base station if the base station determines to off-load only the user-plane data;
   wherein,
   if the base station determines not to activate CS off-loading, then the base station transmits the signaling to the CN for the CN to control the signaling, and the user-plane data from the UE of the call parties is forwarded to another call party of the call via the base station, the CN and an Internet.

2. The radio signal transmission method according to claim 1, wherein when the base station is booted, the base station obtains a CS off-loading configuration from the CN to determine whether to perform CS off-loading.

3. The radio signal transmission method according to claim 1, wherein when receiving the CS call initiated by the UE, the base station obtains a telephone number of a callee, and the base station accordingly finds the ID code of the telephone number of the callee.

4. The radio signal transmission method according to claim 1, wherein if the base station determines that the ID codes of the call parties do not reside on the same base station or the same group of base stations, then the base station transmits the signaling to the CN for the CN to control the signaling, and the user-plane data from the UE of the call parties is forwarded to another call party of the call via the base station, the CN and an Internet.

5. A radio signal transmission system, comprising:
   a core network (CN);
   at least one base station wirelessly coupled to the CN; and at least one user equipment (UE) wirelessly coupled to the base station;

wherein, the base station determines whether to activate CS off-loading after the UE initiates a CS call;

the base station determines whether identification (ID) codes of all call parties reside on the same base station or on the same group of base stations of the radio signal transmission system, if CS off-loading is to be activated;

the base station determines whether to off-load only a user-plane data if the ID codes of the call parties reside on the same base station or on the same group of base stations;

a signaling is processed by the base station and the user-plane data is directly forwarded to another call party of the call via the base station if the base station determines to off-load not only the user-plane data;

the signaling is controlled by the CN and the user-plane data is directly forwarded to another call party of the call via the base station if the base station determines to off-load only the user-plane data; and if the base station determines not to activate CS off-loading, then the base station transmits the signaling to the CN for the CN to control the signaling, and the user-plane data from the UE of the call parties is forwarded to another call party of the call via the base station, the CN and an Internet.

6. The radio signal transmission system according to claim 5, wherein when the base station is booted, the base station determine whether to perform CS off-loading according to a CS off-loading configuration obtained from the CN.

7. The radio signal transmission system according to claim 5, wherein when receiving the CS call initiated by the UE, the base station obtains a telephone number of a callee, and the base station accordingly finds the ID code of the telephone number of the callee.

8. The radio signal transmission system according to claim 5, wherein if the base station determines that the ID codes of the call parties do not reside on the same base station or the same group of base stations, then the base station transmits the signaling to the CN for the CN to control the signaling, and the user-plane data from the of the call parties is forwarded to another call party of the call via the base station, the CN and an Internet.

9. A radio signal transmission method used in at least one base station wirelessly coupled to a core network (CN) and at least one user equipment (UE), the radio signal transmission method comprising:

determining by the base station whether to activate CS off-loading when the base station receives a circuit switch (CS) call initiated by the UE;

determining by the base station whether identification (ID) codes of all call parties reside on the same base station or on the same group of base stations of the radio signal transmission system, if CS off-loading is to be activated;

determining by the base station whether to off-load only a user-plane data if the ID codes of the call parties reside on the same base station or on the same group of base stations;

processing a signaling by the base station and directly forwarding the user-plane data to another call party of the call via the base station if the base station determines to off-load not only the user-plane data; and transmitting the signaling to the CN for the CN to control the signaling and directly forwarding the user-plane data to another call party of the call via the base station if the base station determines to off-load only the user-plane data;

wherein, if the base station determines not to activate CS off-loading, then the base station transmits the signaling to the CN for the CN to control the signaling, and the user-plane base station, the CN and an Internet.

10. The radio signal transmission method according to claim 9, wherein when the base station is booted, the base station determines whether to perform CS off-loading according to a CS off-loading configuration obtained from the CN to.

11. The radio signal transmission method according to claim 9, wherein when receiving the CS call initiated by the UE, the base station obtains a telephone number of a callee, and the base station accordingly finds the ID code of the telephone number of the callee.

12. The radio signal transmission method according to claim 9, wherein if the base station determines that the ID codes of the call parties do not reside on the same base station or the same group of base stations, then the base station transmits the signaling to the CN for the CN to control the signaling, and the user-plane data from the UE of the call parties is forwarded to another call party of the call via the base station, the CN and an Internet.

13. A base station, comprising:

a control unit;

a radio interface coupled to the control unit and controlled by the control unit; and a network interface coupled to the control unit and controlled by the control unit;

wherein the control unit determines whether to activate CS off-loading when the radio interface receives a circuit switch (CS) call initiated by a UE;

the control unit determines whether identification (ID) codes of all call parties reside on the same base station or on the same group of base stations of a radio signal transmission system if CS off-loading is to be activated;

the control unit determines whether to off-load only a user-plane data if the ID codes of the call parties reside on the same base station or the same group of base stations;

the control unit processes a signaling and directly forwards the user-plane data to another call party of the call via the radio interface if the control unit determines to off-load not only the user-plane data;

the control unit transmits the signaling to a core network (CN) via the network interface for the CN to control the signaling and directly forwards the user-plane data to another call party of the call via the radio interface if the base station determines to off-load only the user-plane data; and if the control unit determines not to activate CS off-loading, then the control unit transmits the signaling to the CN via the network interface for the CN to control the signaling, and the user-plane data from the UE of the call parties is forwarded to another call party of the call via the radio interface, the network interface, the CN and an Internet.

14. The base station according to claim 13, wherein when the base station is booted, the control unit determines whether to perform CS off-loading according to a CS off-loading configuration obtained from the CN.

15. The base station according to claim 13, wherein when the radio interface receives the CS call initiated by the UE, the base station obtains a telephone number of a callee, and the control unit accordingly finds the ID code of the telephone number of the callee.

16. The base station according to claim 13, wherein if the base station determines that the ID codes of the call parties do not reside on the same base station or on the same group of base stations, then the base station transmits the signaling to the CN for the CN to control the signaling, and the user-plane data from the UE of the call parties is forwarded to another call party of the call via the radio interface, the network interface, the CN and an Internet.

* * * * *